US009767443B1

(12) United States Patent
Wilson et al.

(10) Patent No.: US 9,767,443 B1
(45) Date of Patent: Sep. 19, 2017

(54) TIMING A NOTIFICATION OF AN ONLINE FINANCIAL EVENT

(71) Applicant: Square, Inc., San Francisco, CA (US)

(72) Inventors: Jesse Wilson, Waterloo (CA); Brian Grassandonia, San Francisco, CA (US); Matthew Rhodes, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 232 days.

(21) Appl. No.: 14/276,659

(22) Filed: May 13, 2014

(51) Int. Cl.
*G06Q 20/00* (2012.01)
*G06Q 20/10* (2012.01)
*G06Q 20/40* (2012.01)

(52) U.S. Cl.
CPC ......... *G06Q 20/10* (2013.01); *G06Q 20/4012* (2013.01); *G06Q 20/4018* (2013.01)

(58) Field of Classification Search
None
See application file for complete search history.

(56) References Cited

U.S. PATENT DOCUMENTS

| | | | | |
|---|---|---|---|---|
| 4,838,384 A * | 6/1989 | Thangavelu | ......... | B66B 1/2458 |
| | | | | 187/385 |
| 5,506,898 A * | 4/1996 | Costantini | ............. | H04M 3/523 |
| | | | | 379/265.04 |
| 6,707,905 B2 * | 3/2004 | Lenard | .................. | G06Q 10/06 |
| | | | | 379/201.01 |
| 6,829,583 B1 * | 12/2004 | Knapp | ................... | G06Q 10/02 |
| | | | | 705/15 |
| 6,839,566 B2 * | 1/2005 | Casaccia | ............... | H04L 1/0007 |
| | | | | 370/465 |
| 6,876,993 B2 * | 4/2005 | LaButte | ................. | G06Q 10/06 |
| | | | | 706/47 |
| 8,208,388 B2 * | 6/2012 | Casaccia | ............... | H04L 1/0007 |
| | | | | 370/252 |
| 8,571,975 B1 * | 10/2013 | Lehman | ................. | G06Q 20/04 |
| | | | | 705/39 |
| 2002/0114442 A1 * | 8/2002 | Lieberman | .......... | H04M 3/5183 |
| | | | | 379/266.06 |
| 2003/0036399 A1 * | 2/2003 | Casaccia | ............... | H04L 1/0007 |
| | | | | 455/515 |

(Continued)

*Primary Examiner* — Chika Ojiaku
(74) *Attorney, Agent, or Firm* — Eric L. Sophir; Dentons US LLP

(57) ABSTRACT

A method and apparatus for timing a notification of an online financial event are disclosed. A sender initiates a financial transaction involving a recipient, such as a transfer payment to the recipient, by sending a message to the recipient and a computer system. The computer system obtains contact information for the sender and recipient from the message, and determines that the financial transaction cannot be completed without additional information from, e.g., the sender. The computer system sends a message to the sender requesting the additional information, and determines a period of time to wait before notifying the recipient that the transfer payment was initiated. If the period of time expires without the sender providing the additional information, the computer system sends the notification message. However, if the sender responds within the period of time, no notification message is sent, thereby avoiding the sending of a potentially unnecessary message.

22 Claims, 10 Drawing Sheets

(56) References Cited

U.S. PATENT DOCUMENTS

| | | | |
|---|---|---|---|
| 2003/0120936 A1* | 6/2003 | Farris | G06F 21/83 713/189 |
| 2004/0039630 A1* | 2/2004 | Begole | G06Q 10/105 705/320 |
| 2005/0089004 A1* | 4/2005 | Casaccia | H04L 1/0007 370/347 |
| 2005/0286686 A1* | 12/2005 | Krstulich | G06Q 30/0205 379/32.01 |
| 2006/0224542 A1* | 10/2006 | Yalamanchi | G06N 5/04 706/47 |
| 2006/0277550 A1* | 12/2006 | Williams | G06F 9/5027 718/107 |
| 2007/0136118 A1* | 6/2007 | Gerlach | G06Q 10/06 705/7.21 |
| 2009/0281817 A1* | 11/2009 | Ferrara | G06Q 10/06 705/1.1 |
| 2010/0169264 A1* | 7/2010 | O'Sullivan | G06Q 10/10 706/52 |
| 2010/0211592 A1* | 8/2010 | Brownlee | H04L 12/58 707/769 |
| 2010/0250682 A1* | 9/2010 | Goldberg | G06Q 10/107 709/206 |
| 2011/0087742 A1* | 4/2011 | Deluca | G06Q 10/107 709/206 |
| 2012/0246252 A1* | 9/2012 | Denise | G06Q 10/107 709/206 |
| 2013/0275301 A1* | 10/2013 | Lehman | G06Q 20/04 705/42 |
| 2013/0316808 A1* | 11/2013 | Nelson | G07F 17/3204 463/29 |
| 2014/0046851 A1* | 2/2014 | Lehman | G06Q 20/04 705/44 |
| 2014/0304510 A1* | 10/2014 | Sannegowda | G06F 21/44 713/170 |
| 2014/0348143 A1* | 11/2014 | Kato | H04W 52/0206 370/336 |
| 2015/0170092 A1* | 6/2015 | Klein | H04L 51/34 705/7.42 |

* cited by examiner

To: susan@mail.com ~302
From: pay@square.com ~306
Subject: jon@mail.com has sent you $5 ~314 jon@mail.com has successfully sent you $5 for ~316
"Lunch on Tuesday"

To: susan@mail.com ~302
From: jon@mail.com ~304
CC: pay@square.com ~306
Subject: $5 ~308

Lunch on Tuesday ~310

FIG. 5A

| To: | susan@mail.com ~502 |
|---|---|
| From: | pay@square.com ~504 |

Subject: $5 ~506 jon@mail.com has sent you $5. Go here to ~508 redeem!

FIG. 5B

510 → http://www.

Account Number: ~512

Expiration Date: ~514

Redeem $5 ~516

TIMING A NOTIFICATION OF AN ONLINE FINANCIAL EVENT

BACKGROUND

A sender can initiate an online financial transaction, such as transferring money to a recipient over the Internet. For example, the sender and recipient can use online banking services. To transfer money, the sender can communicate with a financial computer system, and can request that the financial computer system transfer funds to the recipient. The financial computer system can send an email to the recipient notifying the recipient of the monetary transfer, and can provide a link to enable the recipient to complete the transfer. The financial computer system executes the monetary transfer utilizing a financial system, such as the automated clearing house (ACH) financial network.

BRIEF DESCRIPTION OF THE DRAWINGS

Embodiments of a technique will be described and explained through the use of the accompanying drawings in which:

FIGS. 3A-C are illustrations of example user interfaces for transferring money over email between a sender and a recipient;

FIGS. 5A-B are illustrations of example user interfaces for transferring money between a sender and a recipient, where the recipient does not have an account associated with the payment service system;

DETAILED DESCRIPTION

Figure 1:
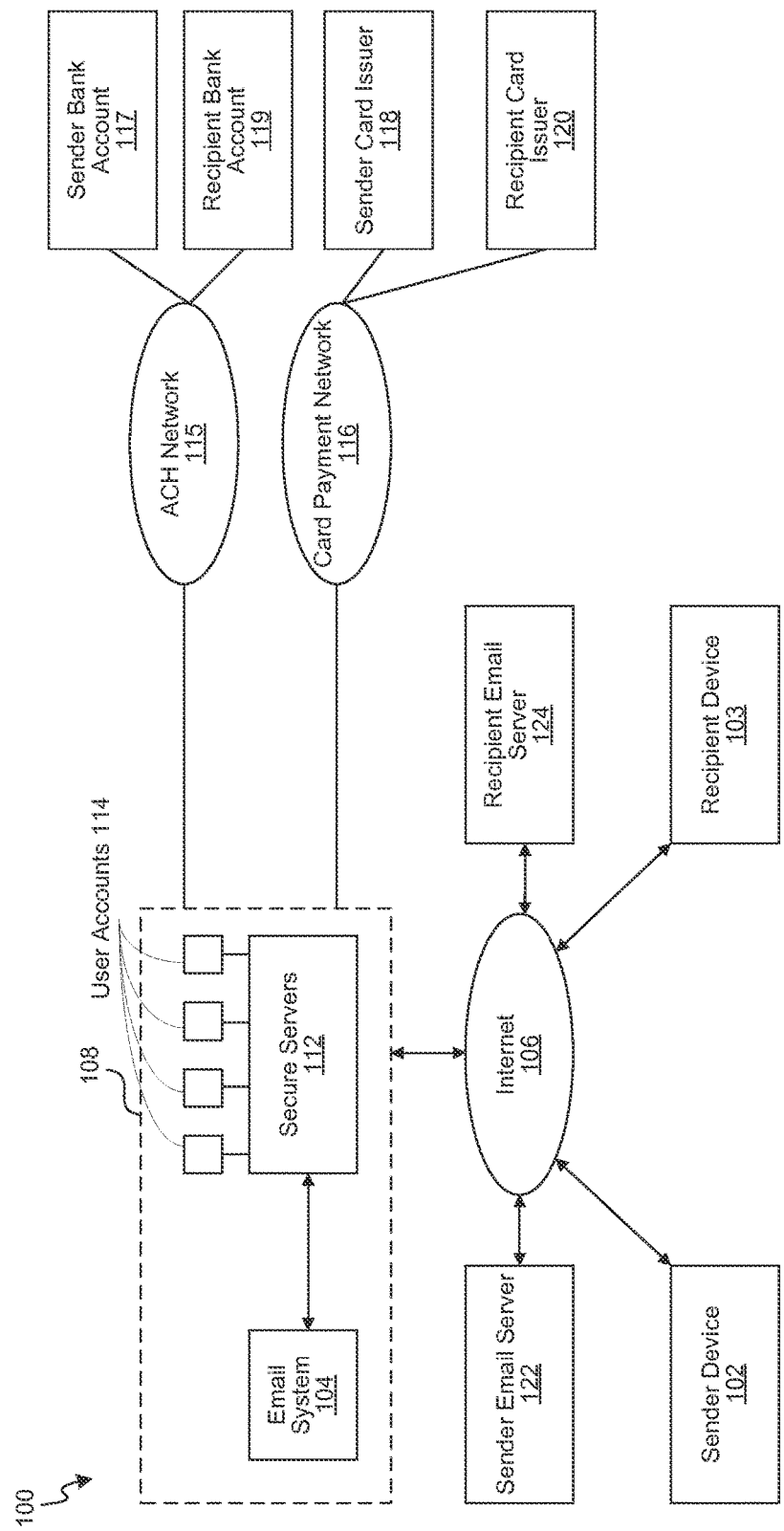
FIG. 1 is a schematic illustration of an example system architecture for transferring money over email.

In this description, references to "an embodiment," "one embodiment," "an implementation," or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

This description introduces a technique of timing a notification of an online financial event. In some embodiments, a user can initiate an online financial event, such as a monetary transfer. To transfer money, the user ("the sender") communicates with a financial computer system, and requests that the financial computer system transfer funds to the recipient. The financial computer system may need additional information, such as bank information, e.g., account number and routing number, of the sender's bank account. To obtain the needed information, the financial computer system sends a message to the sender requesting the information. To let the recipient know that the monetary transfer has been initiated, the financial computer system also sends a first notification email to the recipient to notify the recipient of the monetary transfer.

Subsequently, the sender provides his bank information. The financial computer system executes the monetary transfer and sends a second processing complete email to the recipient to notify the recipient that the monetary transfer has been processed. When the recipient checks his email, he sees that the financial computer system sent him two messages within a short (e.g., five minutes) period of time. He may become irritated when he realizes that one of the messages was unnecessary. Ideally, the unnecessary message could be recalled or otherwise deleted by the financial computer system. However, once an email is sent to a user, it is difficult and in some cases impossible to recall or otherwise delete the email. Utilizing the technique introduced herein, this unnecessary email can be prevented. The technique can also be utilized to prevent unnecessary messages of other types, such as text messages.

In some cases, online financial transactions between two parties require additional information after initiation, and cannot be processed without the additional information. For example, in the above described monetary transfer, the monetary transfer cannot be processed without the bank information, as the monetary transfer needs a source of funds. In another example, a person wants to fund a monetary transfer using a credit card. He swipes the credit card to provide account information (i.e. account data) for the transfer. However, processing the transfer may not be possible without the card verification value (CVV) from the credit card. So, while both of these transactions have been initiated, they cannot be processed or completed until the additional information is provided.

Further, it may take some time for the sender to provide the needed information. For example, the sender may need to return home to find a check to obtain the account and routing number for the bank account, or some urgent issue may arise that the sender needs to immediately address. The sender may resultantly take a significant amount of time to respond to the request for the additional information.

In a situation where an online financial transaction is initiated, it is often desirable to notify the parties involved that the transaction was successfully initiated. This provides the parties with some assurance that the system that is processing the financial transaction is working. For example, two people may go to lunch, and the first person may pay the bill using his credit card. The second person (the sender) may initiate a transfer payment to pay the first person (the recipient) for his portion of the lunch. After initiating the transfer, the sender may send a message to the recipient to notify the recipient that the transfer was initiated. If the recipient doesn't receive any notification from the monetary transfer system, he may become concerned that something went wrong with the transfer.

To prevent such concern, monetary transfer systems often notify the parties when a transfer is initiated, such as by sending a notification email or text message. However, emails or texts such as these can turn out to be unnecessary when the sender promptly provides the needed additional information.

Utilizing the technique described in this application, after initiation of an online financial transaction that requires additional information, the timing of the message sent to notify the parties can be adjusted to prevent an unneeded notification email from being sent. For example, the financial computer system can determine to wait ten minutes to make time available for the sender to provide the needed additional information. If the user is able to provide the additional information before ten minutes passes, the financial computer system can send only the second processing complete message, thereby preventing the first notification message from being sent.

Further, the timing of the first notification email can be optimized. The timing of the notification email can be a balance between preventing the initial notification email from being sent, and provision of a timely notification that the transaction was successfully initiated. The longer the financial computer system waits to send the initial notification email, the higher the likelihood that the recipient may become concerned that the there is a problem with the transaction. The shorter the financial computer system waits, the higher the likelihood that the initial notification email will turn out to be unnecessary for the cases where the second processing complete email is sent shortly thereafter.

In the following description, the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Further, the example of a monetary transfer from a sender to a recipient is used, for illustrative purposes only, to explain various aspects of the technique. Note, however, that the technique introduced here is not limited in applicability to senders and recipients, nor to monetary transfers. The technique can be utilized with essentially any transaction that involves the sending of a first notification or status message, where a second message that can fulfill the purpose of the first message can be shortly thereafter sent based on one of the parties to the transaction completing a task whose completion is required in order to process or complete the transaction. Hence, the term "monetary transfer," "transfer payment," or similar terms generally refer to any type of financial transaction with the above described characteristic. Examples of monetary transfers include cash balance transfers, credit transfers, virtual currency transfers, wire transfers, etc. The terms "email message" and "email" are used interchangeably, and both refer to an email including the message body, header, message identifier, recipient field, sender field, date, time, subject line, etc., of the email. In addition, the terms "sender" and "recipient" generally refer to the parties involved in a financial transaction.

FIG. 1 is a schematic illustration of an example system architecture 100 for transferring money via a messaging system, such as email or short message service (SMS). While examples in this application utilize email as the messaging service, any service that supports sending messages between users can be utilized. The system 100 can use a messaging service to have money transferred over bank account or debit card networks, which will be described further below. The overall system 100 includes a sender device 102, e.g., a desktop computer, connected to a network, e.g., the Internet 106. The sender device 102 is a computing device capable of running a messaging application, such as an application for sending email or SMS messages. For example, the sender device 102 can be a smartphone, a tablet, a desktop computer, a laptop computer, or other data processing apparatus. The recipient device 103 is also a computing device connected to the Internet 106. The recipient device 103 can be a mobile device, e.g., a smartphone, tablet, or other portable data processing apparatus, or can be a desktop computer, or some other data processing apparatus. A sender can use the sender device 102 to send, through a sender message server 122, a message to a recipient account to transfer money via a messaging service. The recipient account can receive the message through the recipient message server 124, which provides the message for display on the recipient device 103, e.g., using standard messaging protocols, such as Simple Mail Transfer Protocol (SMTP) for email messages or SMS for text messages. Transferring money via a messaging service will be described further below in reference to FIGS. 2-7.

A payment processor operates a payment service system 108. The payment processor processes transfers conducted between the sender and recipient devices 102, 103. The sender device 102 can send a message to the recipient device 103 and to the payment service system 108, e.g., the payment service system 108 is carbon copied (CC'ed) on the email. The payment service system can, based on the message, transfer money between a sender financial account to a recipient financial account, and can communicate with the sender and recipient devices 102, 103 using a message system 104, e.g., a mail server operating under SMTP or a text message server that supports SMS. The payment service system 108 includes one or more servers 112, at least some of which can handle secure transactions (e.g., using a secure server), to process all messages with the sender and recipient devices 102,103. In general, servers 112 can store public merchant information such as the merchant's address or phone number. The servers 112 also handle secure information such as credit card numbers, bank accounts, user accounts 114, e.g., user identifying or profile information, debit card numbers, or other sensitive information.

Each user account 114 can be associated with one or more financial accounts, e.g., debit or credit card accounts, of the user. An account can be a financial account managed by a card issuer, such as the sender card issuer 118 or the recipient card issuer 120, and can be associated with a card number. In some implementations, the one or more financial accounts are stored at the secure server 112. Generally, card issuers, such as sender card issuer 118 and recipient card issuer 120, issue a physical payment card for each account that is a card account.

The payment service system 108 can communicate with a computer system of a card payment network 116, e.g. a debit card payment network such as STAR or PULSE, a credit card payment network such as Visa's VisaNet Payment system or MasterCard's BankNet network, etc. The payment service system 108 can communicate with a computer system of card payment network 116 over the same network 106 used to communicate with the sender device 102, or over a different network. The computer system of the card payment network 116 can communicate in turn with a computer system of a sender card issuer 118, e.g., a bank, and a computer system of a recipient card issuer 120. The sender card issuer 118 and the recipient card issuer 120 can transfer money, e.g., over a debit payment network, in response to a request to transfer money from the payment service system 108.

In some implementations, the payment service system 108 can communicate with a computer system of the Automated Clearing House (ACH) network 115. The computer system of the ACH network 115 can communicate with a sender bank account 117 and a recipient bank account 119. The sender bank account 117 and the recipient bank account 119 can transfer money, e.g., using the ACH network. In response to a request to transfer money from the payment service system 108. There can also be computer systems of other entities, e.g., the card acquirer, between the payment service system 108 and the card issuers and between the payment service system 108 and the bank accounts.

Eventually, in order to receive funds from the transfer, the recipient will need to provide financial account information sufficient to receive funds to the payment service system 108. For example, in the case of a bank account, the recipient can provide the bank account number and routing number. The recipient's financial account can also be associated with a debit card account, an automated teller machine (ATM) card account, a credit card account, or another third party financial account. In addition, in some implementations, if the recipient has not entered the financial account information, the payment processor can hold the received funds until the financial account information is provided.

To transfer money between the sender and the recipient, the payment service system 108 can operate as a gateway or a middleman. To operate as a gateway, the payment service system 108 can identify accounts, e.g., stored at the secure servers 112, for both the sender and the receiver. The payment service system 108 can submit a request to an appropriate financial institution to transfer the money. For example, when the financial account to be used for the transfer payment is a card account, the request can be submitted to the sender's card issuer or to the receiver's card issuer, and the request can be sent over debit rails. That is, a debit card network can receive the request and can carry out the request to transfer money. The appropriate card issuer can receive and process the request by transferring money to the appropriate account.

To operate as a middleman, the payment service system 108 can receive a payment amount by processing an account, e.g., a credit card account or a debit card account, of the sender and hold the payment amount. The payment service system 108 can push the payment amount, e.g., over debit rails, to a debit account of the recipient. Instead of holding the payment amount, the payment service system 108 can also forward the payment once the recipient links an account with the payment service system 108. Alternatively, the payment service system 108 can generate a transaction using ACH that debits an amount from the sender bank account and can credit the amount into a recipient bank account, e.g., using ACH, or onto a debit account, e.g., over debit rails, of the recipient.

Figure 2:
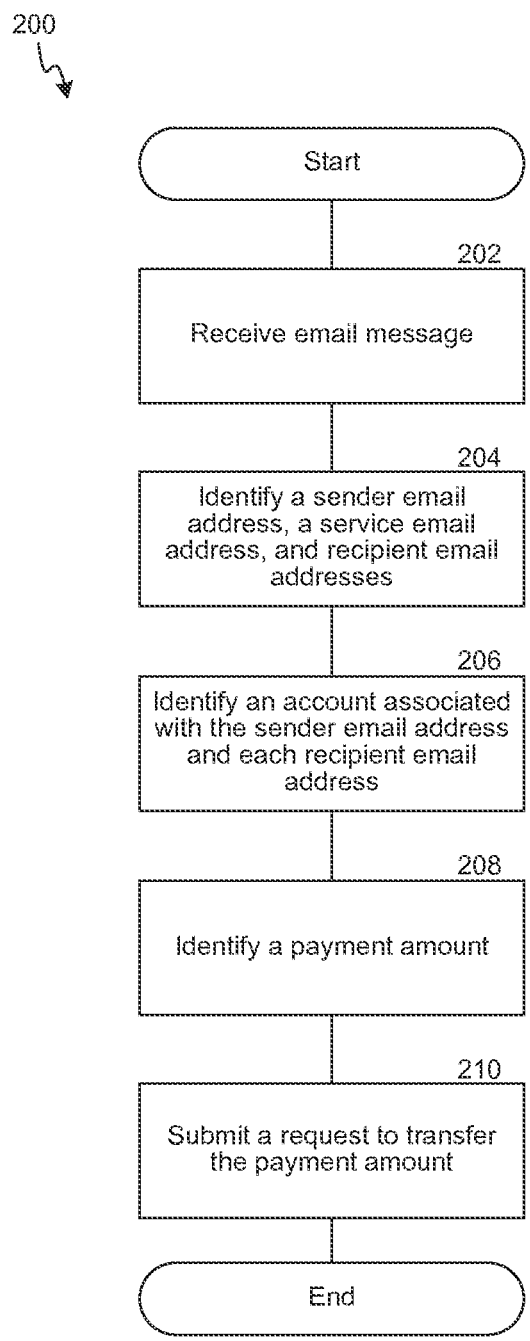
FIG. 2 is a flow chart of an example process of transferring money over email from a sender and to a recipient where both have accounts associated with a payment service system.

FIG. 2 is a flow chart of an example process of transferring money over email from a sender and one or more recipients, where the sender and the recipients each have accounts associated with the payment service system. While the example of this figure transfers money using email, analogous systems and an analogous flow can be used to transfer money using other messaging systems, such as via systems that transfer money by sending any of internet protocol (IP) messages, SMS/text messages, or instant messages. For convenience, the process will be described with respect to a system, e.g., the payment service system 108 as described above in reference to FIG. 1.

A sender decides to send money to or request money from a recipient, and starts a process for transferring the money over email. Using a device such as a smartphone, the sender sends an email message to a recipient and Cc's a service email address. In some embodiments, the email is manually generated by the user using an email application on his device. In other embodiments, the sender launches a money transfer application on his device that enables the sender to initiate the money transfer. The money transfer application displays a screen which contains an interface that enables the sender to indicate to send or request an amount of money, as is illustrated at user interface 320 of FIG. 3C. Based on the sender's input, the money transfer application generates the email to send to the recipient and the service email address. The user or the money transfer application then sends the email message using the sender device.

The system receives the email message from the sender device (step 202). The email message can be forwarded from an email server of the system. The email message can have a syntax that includes, e.g., in the email message's headers, a sender email address, a service email address, a payment amount, and one or more recipient email addresses. The email message can also include an optional description. An example email message is discussed further below in reference to FIG. 3A. In some embodiments, the one or more recipient's email addresses are in the body of the email. In embodiments that use other messaging systems, the addresses are of a type appropriate for that other system. For example, when the messaging system supports SMS systems, the address can be a phone number associated with the sender, the recipient, or the system. Further, the addresses can be in the body of the message.

The system can operate one or more service email addresses, e.g., pay@square.com or invoice@square.com. The system receives messages emailed to each of the one or more service email addresses and processes the messages based on the email address. For example, messages sent to pay@square.com can cause the system to transfer money from the sender to the recipient based on the sender and recipient email addresses, in which case the sender account is used as a source of funds for the transfer payment, which is deposited in the recipient account. On the other hand, messages sent to invoice@square.com can cause the system to send an invoice from the sender email address to the recipient email address, in which case electronic funds for the transfer payment are obtained from the recipient account and are deposited in the sender account. These are both described in further detail below. In the example of this figure, the email is sent to pay@square.com.

The system can authenticate received emails for integrity. For example, the system can use domain keys to verify message integrity and a domain of an email sender. The system can also prevent email spoofing and verify sender Internet Protocol (IP) addresses using sender policy framework (SPF). The system identifies the sender email address, a service email address, and each recipient email address from the email message (step 204). The system can parse a From field of the email message to identify the sender email address. The system can parse a To or CC field of the email message to identify each recipient email address. The system can also parse the To or CC field of the email message to identify the service email address. To identify the service email address, the system can compare each email address in the email message to a list of service email addresses stored at the system.

The system identifies, for the sender email address, a sender account associated with the payment service system and, for each of the one or more recipient email addresses, a respective recipient account associated with the payment service system (step 206). The accounts can be identified from a secure database, e.g., the secure server 112, which associates email addresses to accounts. When the accounts are card accounts, each card account can be associated with a physical debit card and with a user account. The accounts herein can be any of various types of financial accounts, e.g., bank accounts, wire transfers, credit card accounts, line of credit accounts, or other funding mechanisms.

The system identifies a payment amount from the email message (step 208). The payment amount can be in the subject or body of the email message. In some implementations, the system identifies text in the email that includes a currency type, e.g., a '$', and designates the text as the payment amount.

In some implementations, the system ignores email messages that do not follow the syntax described in reference to FIG. 2 and FIG. 3A. For example, the system can discard email messages that have more than one service email address in the message, do not have the payment amount in the email message, or have more than one payment amount in the email message. The system can also discard if there is not a valid payment amount following a currency symbol, e.g., the payment amount is "$X" in the email. In these cases, the system can notify the sender and/or recipient email address that the system did not transfer money to the recipient email addresses.

In some implementations, the system identifies a description in the email message. For example, the email message can include a description, e.g., "Lunch on Tuesday," of the reason for a sender transferring the money. The description can be included in the body of the email message. The system can store the description of the transfer in the secure database.

The system optionally sends a confirmation email to the sender before submitting a request to transfer the payment amount. That is, the sender must engage a link in the confirmation email, e.g., the sender replies to the email with a "YES," to confirm the payment, or clicks on a link in the email, which redirects the sender to a webpage where the sender can click, for example, a "YES" radio button to confirm the payment. Upon receiving an indication that the sender engaged with the link, the system can submit a request to transfer the payment amount. In some implementations, the system sends a confirmation email to the sender and also submits the request to transfer the payment amount. The sender can receive the confirmation email and can engage with the email, e.g., click on a link or reply to the email, to report an unauthorized payment. In embodiments where a money transfer application generates the email received at step 202, the system can send a message to the money transfer application that causes the application to display a screen. The screen prompts the sender to authorize and/or confirm the transfer payment and/or the payment amount. The sender can use the screen to indicate his confirmation, such as by touching a virtual confirmation button, and the system can send the transfer payment.

The system submits a request, e.g., to an appropriate financial institution, such as the card issuer when the account is a card account or the credit provider when the account is a credit account, to transfer the payment amount from an account associated with the sender email address to an account associated with a recipient email address (step 210). In some implementations, the system splits the payment amount among multiple recipient accounts, and an account is determined for each recipient account. For example, the system can divide the payment amount into equal portions among the recipient accounts and can submit a request to transfer, for each recipient email address, the respective portion to the respective account of the respective recipient email address. In some other implementations, the system transfers the same payment amount to each recipient account.

The system can receive a confirmation of the transfer from the financial institution. After receiving the confirmation, e.g., from a card issuer, that the payment amount(s) is transferred, the system can send a confirmation email to the sender email address and to each recipient email address indicating a successful transfer. The confirmation email can include the last 4 digits of the appropriate card number. In some implementations, the system sends the confirmation email by replying to the original email message, thereby allowing the original email message and the confirmation email to be displayed in an email client of the recipient.

In some implementations, if the card issuer rejects the transfer, the system can repeat the above mentioned steps 202-210 and request ACH information instead of card information from the recipient.

Under some circumstances, the email message is sent to the system more than once. For example, the sender's device can be a mobile device that has an intermittent Internet connection. The system can generate a hash of a first email message based on headers of the email message. For example, the hash can be based on a message identifier, the recipient field, the sender field, a date, a time, and/or a subject line. If the system receives a second email message, the system generates a hash of the second email message based on headers of the second email message. The system can compare the hashes together, and if they are equal, the system can discard the second email.

FIG. 3A is an illustration of an example user interface 300 for transferring money from a sender to a recipient who both have accounts associated with a payment service system. In some embodiments, the sender can, e.g., using a device, use an email application or a web browser connected to an email server to compose an email. In other embodiments, the sender can use the money transfer application discussed above running on the device to generate the email. The email can include a recipient email address 302, a service email address 306, a sender email address 304, a subject 308, and a body 310. The sender can include a payment amount to be transferred in the subject 308, e.g., "$5," and a description of the money transfer, "e.g., Lunch on Tuesday," in the body 310 of the email. By sending an email in this format, the sender is requesting, using a payment service system that operates pay@square.com, a transfer of $5 from the sender's account to an account of susan@mail.com.

FIG. 3B is an illustration of an example user interface 312 for a transfer confirmation email received by the recipient email address. By way of illustration, after processing the email that is reference in FIG. 3A, the payment service system can send a confirmation email of the transfer to the recipient email address 302. The confirmation email can include a subject 314 that indicates how much a sender has transferred and a description 316 of the transfer.

Figure 3C:
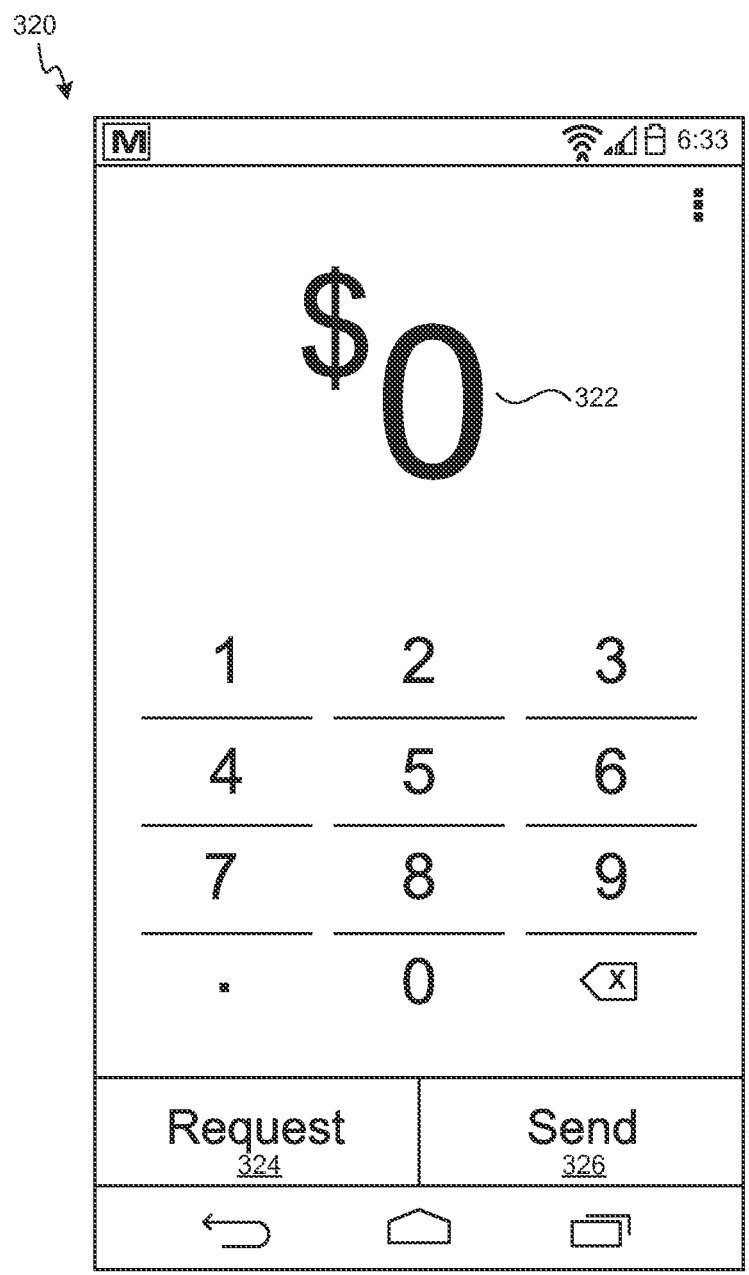

FIG. 3C is an illustration of an example user interface 320 for a money transfer application. The sender can initiate a transfer payment to a recipient by touching the send virtual button 326, or can initiate an invoice requesting a transfer payment from the recipient by touching the request virtual button 324. The sender enters the transfer amount 322 using the virtual keypad that includes virtual buttons for 0-9.

Figure 4A:
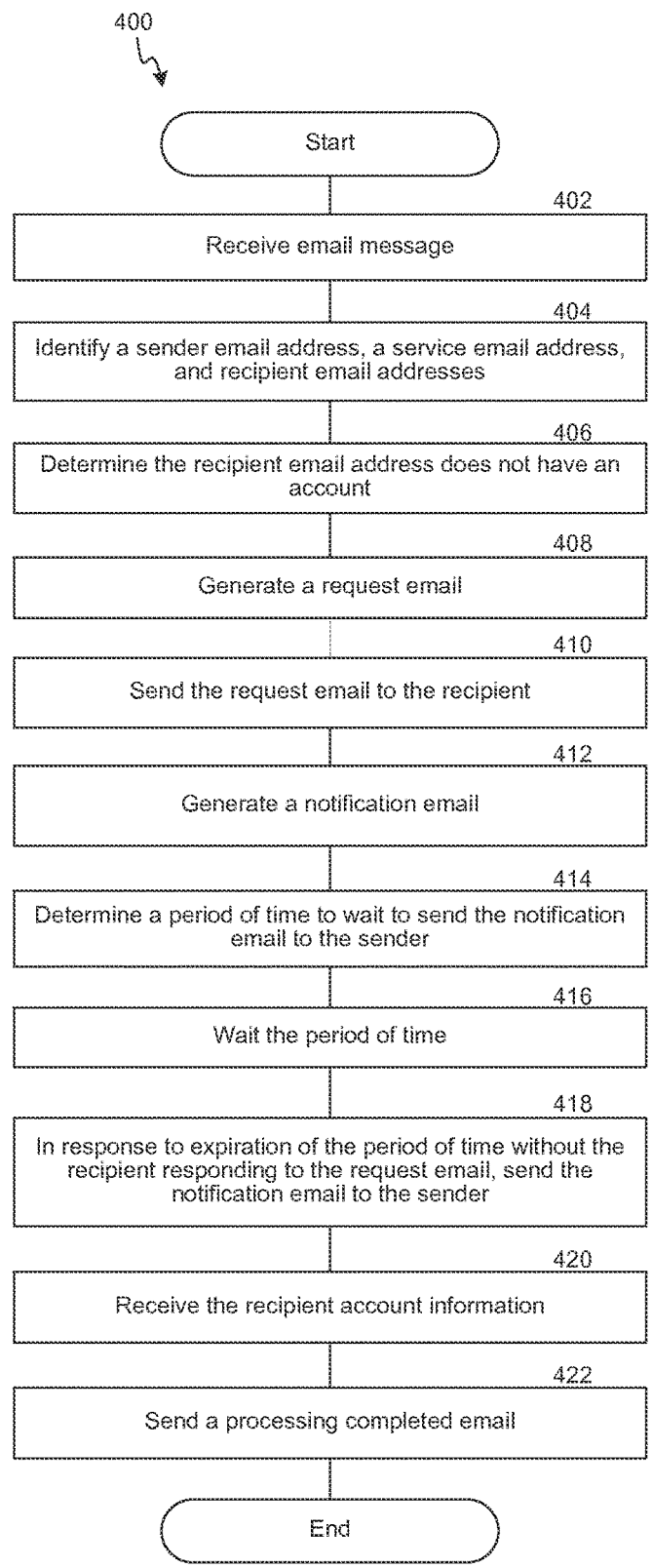
FIG. 4A is a flow chart of an example process of transferring money involving a sender that has an account associated with a payment service system and a recipient that does not have an account associated with the payment service system.

FIG. 4A is a flow chart of an example process of transferring money from a sender that has an account associated with the payment service system and one or more recipients that do not have an account associated with the payment service system. While the example of this figure transfers money using email, analogous systems and an analogous flow can be used to transfer money using other messaging systems, such as systems that transfer money by sending any of internet protocol (IP) messages, SMS/text messages, or instant messages. For convenience, the process will be described with respect to system, e.g., the payment service system 108 as described above in reference to FIG. 1.

The system can operate as described above in reference to steps 202, 204, and 208 of FIG. 2. That is, the system receives an email message from a sender device (step 402). The system identifies a sender email address, a service email address, and recipient email addresses from the email message (step 404). And the system identifies a payment amount (not shown in FIG. 4B).

The system determines that at least one of the recipient addresses do not have an account associated with the system (step 406). After identifying the recipient email address per the discussion above, the system determines whether the recipient email address is associated with an account. The account can be identified from a secure database, e.g., the secure server 112, which associates email addresses to accounts.

In response to the determination that a recipient email address does not have an associated account, the system generates a request email to be sent to the recipient email addresses that do not have an account with the system (step 408), and sends the request email to those recipient email addresses (step 410). The request email can include a link to a resource that requests, for example, an account number and an expiration date. The resource can be customized to the recipient email address. One purpose of the request email is to request/obtain account information for the recipient account to use for the transfer payment. When the email is sent to pay@square.com, electronic funds sent via the transfer payment will be deposited in the recipient account (and the sender account will be used as a source of funds for the transfer payment). When the email is sent to invoice@square.com, the recipient account will be used as a source of funds for the transfer payment (and electronic funds sent via the transfer payment will be deposited in the sender account).

Further, the request email can indicate the transaction type. For example, if the service email address is pay@square.com, the system can generate a payment redemption response email. Alternatively, if the service email address is invoice@square.com, the system can generate an invoice email. Examples of both request emails are discussed further below in reference to FIG. 5A. When the recipient clicks on the link 508 of FIG. 5A, the recipient is redirected to a resource, such as a website which prompts the recipient to enter account information for the recipient account, as is displayed at user interface 510 of FIG. 5B.

If the request email is a payment redemption email, the recipient can receive, through the resource, an indication to provide the account information for the recipient account and redeem the payment amount. That is, the recipient can follow a link, using a recipient device, and utilize the resource to provide the account information and, when the system has the sender account information, redeem the payment amount. The resource can be, for example, a website which prompts the recipient to provide the recipient account information and redeem the payment amount, as is illustrated at user interface 510. The link, which is customized to the recipient, can be encoded with the sender email address and the recipient email address, or can be encoded with an identifier that refers to the sender and recipient email addresses. In some implementations, the link is displayed as a button display object.

Based on the link, the system can identify the respective account for the sender and the recipient. In response to the recipient engaging with the link, e.g., the recipient taps on the link, the system can submit a request to transfer the payment amount from the sender account to the recipient account. In other words, the system can submit a request that results in the sender account being debited the payment amount and that results in the recipient account being credited the payment amount. The amounts debited and credited may be adjusted due to fees associated with the transfer payment, such that the debited amount may differ from the credited amount by an amount that corresponds to a fee or fees associated with the transfer payment.

Alternatively, if the request email is an invoice email, the system can receive, through the resource, an indication to pay the payment amount and to provide the account information for the recipient account. That is, the recipient can follow a link in the resource to pay the payment amount and to provide the account information. Similar to the customized link described above, the system can identify the respective account for each email address. The system can submit a request to transfer the payment amount from the recipient account to the sender account. In other words, the system can submit a request that results in the recipient account being debited the payment amount and that results in the sender account being credited the payment amount. As previously discussed, the amounts debited and credited may be adjusted due to fees associated with the transfer payment.

The system generates a notification email to send to the sender (step 412). Because the recipient has not yet provided the account information for the recipient account, the transfer payment cannot be processed. Further, the amount of time it will take for the recipient to provide the needed account information is not known. The amount time it will take to process the transfer payment is similarly not known. In situations such as this, where an online transaction between a set of parties is initiated but cannot be processed for some unknown period of time, it is desirable to notify the waiting party or parties that the transaction is waiting on an input from another party and cannot be processed. Otherwise, the waiting party or parties may become concerned that something went wrong with the transaction. Here, if the system does not notify the sender that processing of the transfer payment is waiting on input from the recipient, the sender may become concerned that something went wrong with the transfer payment.

On the other hand, it is also desirable to avoid sending unnecessary email to users. It is possible that the recipient may immediately respond to the request for the account information, just as it is possible that the recipient may take a significant period of time to respond to the request. If a notification email is sent to the sender at the same time that the request email is sent to the recipient, in situations where the recipient promptly responds to the request, the notification email may be followed shortly by a processing completed email. The processing completed email is sent to notify the sender and the recipient that processing of the transfer payment was completed and the funds for/from the transfer payment will be shortly, e.g. in a day or two, debited/credited from/to the sender's/recipient's account.

When a notification email is followed shortly by a processing completed email, the notification email is unnecessary, which many people find irritating. The notification email is unnecessary because, once the processing completed email is received by the sender, the information in the notification email contains information that is redundant to the information contained in the processing completed email, or information that is no longer relevant.

The system determines a period of time to wait to send the notification email to the recipient (step 414). The system can determine the period of time based on a trade-off between sending unnecessary email on one side, and causing the sender to become worried that something went wrong with the transfer payment on the other side. The previously sent notification email becomes unnecessary when a processing completed email is sent shortly after the notification email. This can happen when the recipient provides the recipient account information shortly after the notification email was sent, thereby enabling the sending of the processing completed email shortly after the notification email was sent.

The system waits the period of time (step 416). By waiting the period of time to send the notification email to the sender, the system can avoid sending a notification email message that is unnecessary in those cases where the recipient provides the account information for the recipient account prior to the expiration of the period of time. In these cases, shortly following a notification email message with a processing completed email message does not happen. This is because no notification email message is sent at all when the recipient responds with the needed account information prior to the expiration of the period of time.

The recipient may become worried when he neither receives a processing completed email message, nor receives a notification email message notifying him of the delay. Increasing the period of time increases the likelihood that the recipient will become worried, but also provides the recipient with additional time to provide the account information and avoid sending a notification email. Decreasing the period of time reduces the likelihood that the recipient will become worried, but also provides the recipient with less time to provide the account information, which increases the likelihood of sending an unnecessary notification email message.

The period of time can be based on any of various data or estimates, or on no data. Because a purpose of the period of time is to provide the recipient with adequate time to provide the account information, the period of time can be based on how long it takes to provide the account information. For example, the period of time can be based on a person's guess as to how long it will take a typical recipient, a slow recipient, etc., to provide the account information. The period of time can be based on statistical data from previous transfer payments. For example, the period of time can be based on how long it took for 50% of the previous recipients to provide the account information, or for 75% of the previous recipients to provide the account information.

The period of time can be based on an estimated time duration for the recipient to provide the account information. The time duration can be estimated by a person based on no data, can be estimated by a person or computer based on data as to how long it took for previous recipients to provide the account information, can be estimated based on how long it took the current recipient to perform other tasks, etc. The period of time can further be based on a balance between avoidance of sending the notification email, and provision of timely status of the transfer payment to the sender.

In response to expiration of the period of time without the recipient responding to the request email, the system sends the notification email to the sender (step 418). By sending the notification email to the sender in a timely fashion and, resultantly, providing a timely status update to the sender, the system can help alleviate any concern that the sender may have that something has gone wrong with the transfer payment. Note that, in cases where the recipient provides the account information for the recipient account by the expiration of the time period, the system does not send the notification email.

At some point the recipient provides the recipient account information. The recipient can use any of various methods to provide the account information, such as the method discussed at step 410. As discussed at step 410, the request email can include a link to a resource that requests the account information, such as the account number and the expiration. The resource can send the recipient account information to the system where the information is received (step 420). When the resource is a website, the system may host the website, or may communicate with another system that hosts the website. Further, the website can send the recipient account information to the system in any of various ways, such as by updating the secure database to create an association between the recipient account information and the recipient email address, or by sending a message to the system, in which case the system can update the secure database to create the association.

In response to receiving the recipient account information, the system can create a user account at the system for the recipient. The user account can be associated with the recipient email address and the recipient account information, such as the recipient account number and the expiration date, among others. In future money transfers involving the recipient, the system no longer generates a request email due to the creation of the user account and the association of the recipient's email address with the account. Instead, in response to receiving an email message with an appropriate syntax, the system submits a request to transfer money as discussed above in reference to FIG. 2. After a user account is created, the recipient can also transfer money or send invoices to other recipients.

Once the recipient account information is received, the system can process the transfer payment, such as by communicating with a financial system to initiate a process that causes funds for the transfer payment to be debited from and credited to the appropriate accounts of the sender account and the recipient account. After the transfer payment is processed by the system, and processing has transferred to the financial system, the system can generate an email message to notify the sender and the recipient that the processing of the transfer payment is complete, and can send the processing completed email to the sender and the recipient (step 422). The processing complete email includes a message that notifies the sender and recipient that processing of the transfer payment request is complete. The processing complete email can further include a message that notifies the sender and the recipient of the approximate time that that the funds will be debited/credited from/to the appropriate account of the sender and recipient accounts.

Figure 4B:
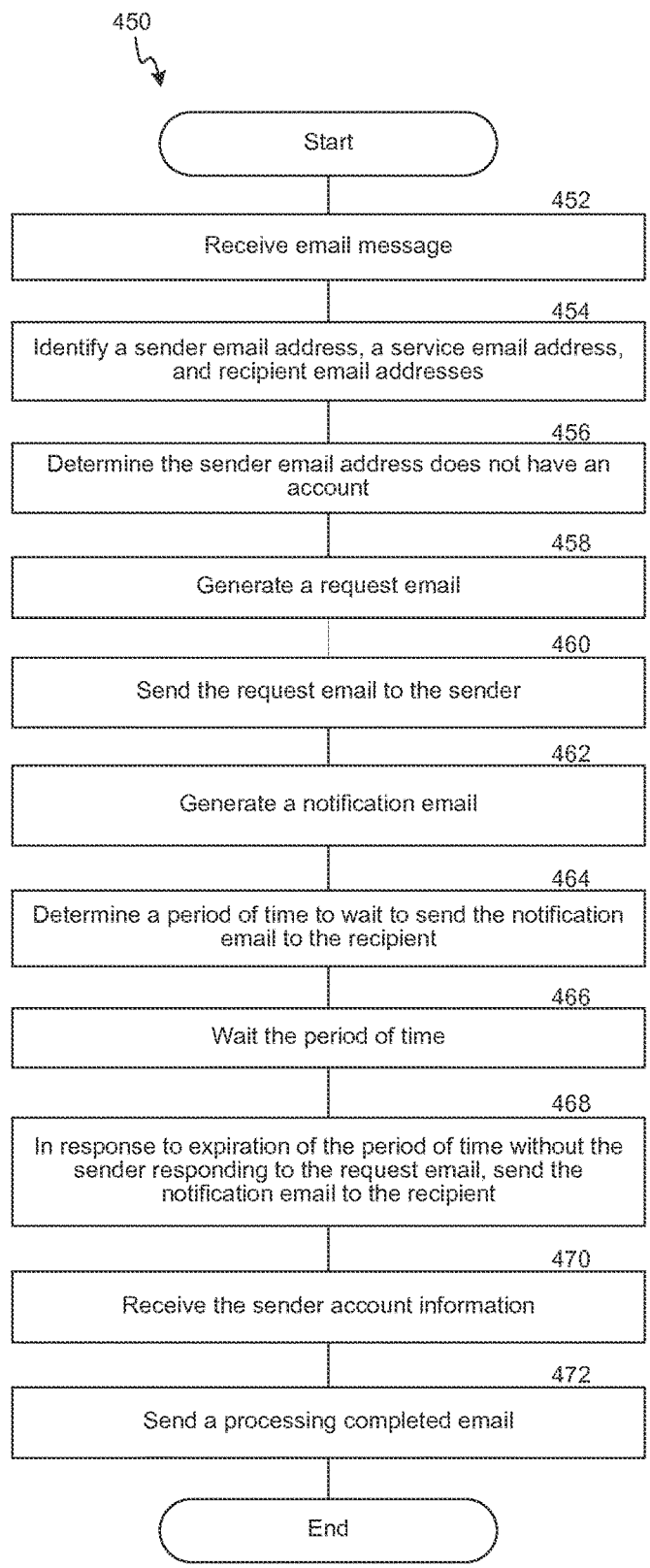
FIG. 4B is a flow chart of an example process of transferring money involving a sender that does not have an account associated with a payment service system and a recipient that does have an account associated with the payment service system.

FIG. 4B is a flow chart of an example process of transferring money from a sender that does not have an account associated with the payment service system and one or more recipients that do have an account associated with the payment service system. The process and steps of FIG. 4B are similar to the process and steps of FIG. 4A. For brevity and to avoid duplication, the following description will focus on the differences.

The system can operate as described above in reference to steps 202, 204, and 208 as described above in reference to FIG. 2. That is, the system receives an email message from a sender device (step 452). The system identifies a sender email address, a service email address, and recipient email addresses from the email message (step 454). And the system identifies a payment amount (not shown in FIG. 4B).

Steps 456-472 are respectively substantially similar to steps 406-422, with the sender substituted for the recipient, and the recipient substituted for the sender. For example, at step 456 the system determines the sender email address does not have an account, rather than, as is done in step 406, determine the recipient email address does not have an account. The following discussion will highlight some noteworthy differences between the steps of FIG. 4A and the steps of FIG. 4B.

As discussed above, step 458 is substantially similar to step 408. Similar to step 408, one purpose of the request email is to request/obtain account information for the sender account to use for the transfer payment. When the email is sent to pay@square.com, the sender account will be used as a source of funds for the transfer payment. When the email is sent to invoice@square.com, electronic funds sent via the transfer will be deposited in the sender account.

Further, because the sender originated the transfer payment, the sender is aware of the transfer and does not need to be informed about the transfer. Accordingly, the request email can simply request the account information for the account to use for the transfer payment. For example, the request email can contain a link to a resource, such as link 508, that requests the account information for the account to use for the transfer payment. The resource can be, for example a website which prompts the sender to ender account information for the sender account. In some embodiments where the money transfer application generates the initial email (i.e. the email that is received by the system at step 452), the system can send a message to the money transfer application that causes the application to display a screen that prompts the sender to enter the account information for the sender account.

As discussed above, step 462 is substantially similar to step 412. At step 412, the notification email is generated to be sent to the sender, who initiated the payment transfer and is aware of the transfer. At step 462, the notification email is generated to be sent to the recipient, who did not initiate the payment transfer and who may not be aware of the transfer. Accordingly, the notification email of step 462 may need to contain more information than the notification email of step 412. For example, the notification email of step 462 can notify the recipient that the sender initiated the payment transfer, and can notify the sender of the transfer type (e.g. a payment to the recipient, or an invoice requesting a payment from the recipient), and can provide a status of the transfer. Further, just as there is concern at step 412 that the notification email may end up being an unnecessary email if the recipient promptly provides the account information for the recipient account, there is a similar concern at step 462 that the notification email may end up being an unnecessary email if the sender promptly provides the account information for the sender account.

As discussed above, step 464 is substantially similar to step 414. The period of time of both steps 414 and 464 defines a waiting period before a notification email will be sent. For step 414, the notification email is to be sent to the sender, who is aware of the transfer payment as he initiated the transfer. However, in step 464, the notification email is to be sent to the recipient, who may not be aware of the transfer payment. As discussed at step 414, the period of time can be a trade-off between a desire to not send unnecessary email to the sender, and a desire to avoid causing the sender to become concerned that there is a problem with the payment transfer. For step 464, the period of time can be a trade-off between a desire to not send unnecessary email to the recipient, and a desire to avoid causing the recipient to become concerned that there is a problem with the payment transfer. As discussed above, the period of time of step 414 and the period of time of step 464 can be different. One reason for this difference is that the two receivers of the notification emails (i.e. the sender of step 414, and the recipient of step 464) may become concerned at different times due to their potentially differing knowledge of the transfer payment. As one term of the trade-off evaluation changes, the period of time can also change.

As discussed above, step 466 is substantially similar to step 416. At step 416, by waiting the period of time, the system can avoid sending a notification email message that is unnecessary in those cases where the recipient provides the account information for the recipient account prior to the expiration of the period of time. Similarly, at step 466, by waiting the period of time (which can be a different period of time than the period of time of step 416), the system can avoid sending a notification email message that is unnecessary in those cases where the sender provides the account information for the sender account prior to the expiration of the period of time.

As discussed above, step 472 is substantially similar to step 422. Note that there can be a case where determinations are made that both the recipient email address does not have an account (step 406), and the sender email address does not have an account (step 456). In such a case, the system can wait until both steps 420 and 470 are completed before sending the processing completed email, as processing may not be possible without account information for both accounts.

FIG. 5A is an illustration of a user interface 500 of a payment redemption email message sent from a payment service system. The email message can be sent from a service email address 504 to a recipient email address 502. The subject 506 can include a description of a sender and a sent payment amount. The description 508 of the email can include a link to a resource, e.g., a customized link described above in reference to FIG. 4, for the recipient to redeem the payment amount.

FIG. 5B is an illustration of an example user interface 510 of a resource linked from the payment redemption email in reference to FIG. 5A. The resource can include text fields for an account number 512, e.g., a debit card number, and an expiration date 514 of the card. The resource can display a button 516 that links to the payment service system. The button can be encoded with an identifier of the recipient and the sender. In response to the recipient engaging the button 516, the payment service system can create an account for the recipient and transfer the payment amount, as described above in reference to FIG. 4.

In some implementations, the resource can request, e.g., display text fields for, additional information from the user. For example, the resource can request a recipient's name, phone number, social security number, or birthday. In some implementations, the payment service system determines the recipient's name from email headers.

Similar to generating the payment redemption email, the payment service system can generate an invoice email. For example, a generated invoice email can have the subject 506 read "jon@mail.com has sent you an invoice for $5." The service email address 504 can be invoice@square.com. The description 508 can read "jon@mail.com has sent you an invoice for $5. Go here to pay!" The customized resource, likewise, can display a button 516 that reads "Pay $5." Upon receiving an indication that a recipient engages with the button 516, the payment service system can create an account for the recipient and invoice the payment amount, as described above in reference to FIG. 4.

Figure 6:
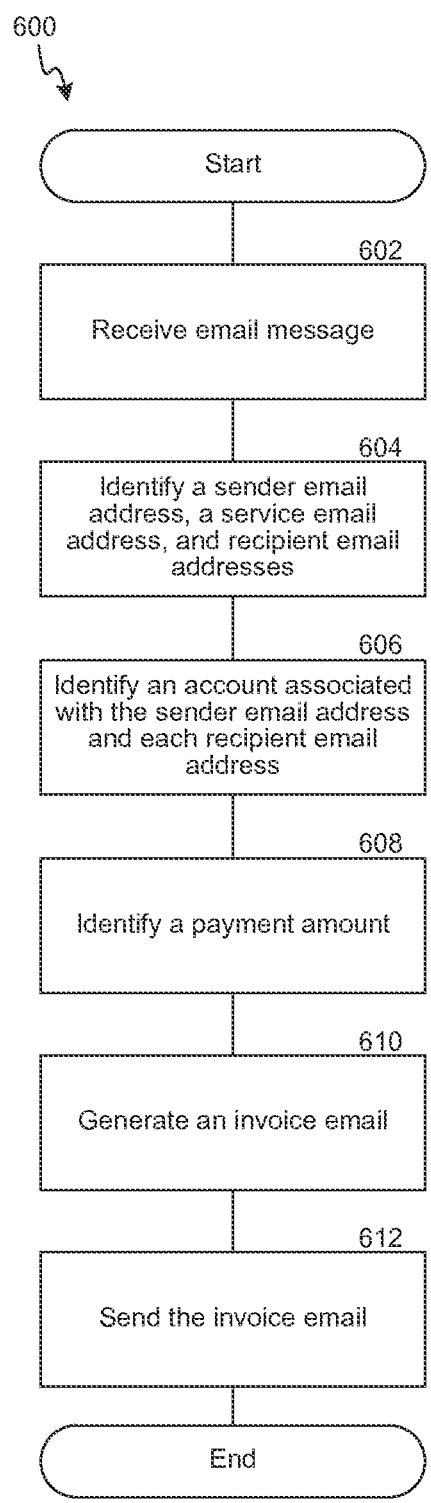
FIG. 6 is a flow chart of an example process of a sender invoicing a recipient for a payment amount.

FIG. 6 is a flow chart of an example process of a sender invoicing a recipient for a payment amount. While the example of this figure transfers money using email, analogous systems and an analogous flow can be used to transfer money using other messaging systems, such as via systems that transfer money by sending any of internet protocol (IP) messages, SMS/text messages, or instant messages. For convenience, the process will be described with respect to a system, e.g., the payment service system as described above in reference to FIG.

The system can operate as described above in reference to steps 202, 204, 206, and 208 as described above in reference to FIG. 2. That is, the system receives an email message from a sender device (step 602). The system identifies a sender email address, a service email address, and recipient email addresses from the email message (step 604). The system identifies an account associated with the sender email address and each recipient email address (step 606). The system identifies a payment amount from the email message (step 608).

Because the sender and each recipient have respective accounts associated with the system, the system can generate an invoice email that includes a link to pay the payment amount from a respective account of each recipient (step 610). The invoice email is described further below in reference to FIG. 7. The system can send each invoice email to the respective recipient email addresses (step 612).

Figure 7:
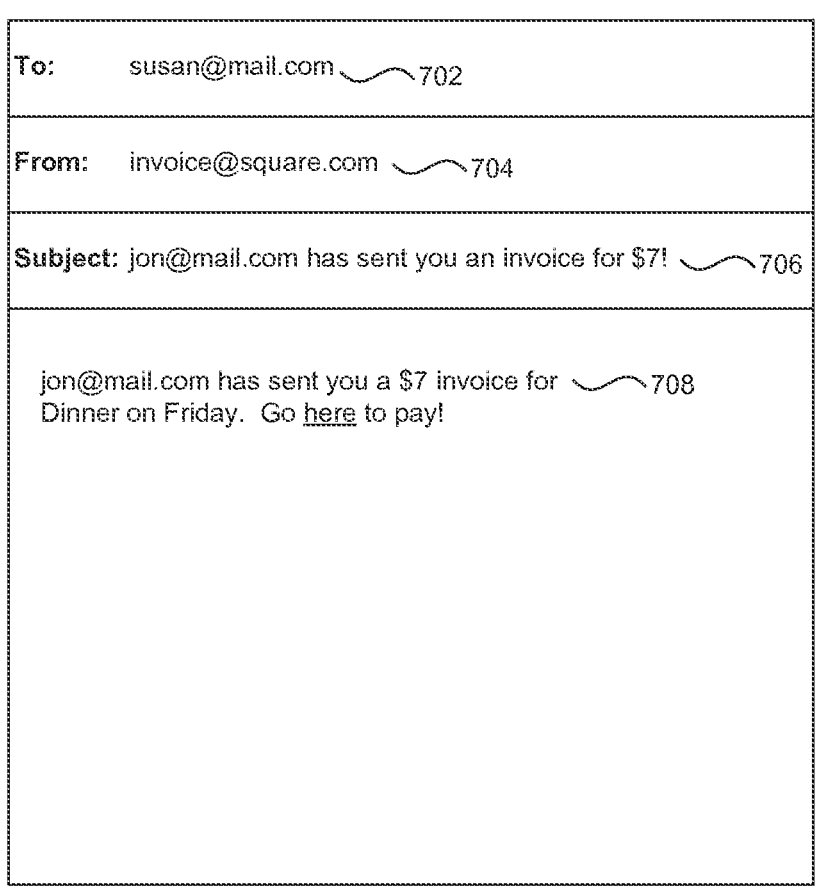
FIG. 7 is an illustration of an example user interface for invoicing a recipient over email.

FIG. 7 is an illustration of an example user interface for invoicing the recipient over email. The email can be manually generated by the sender, or can be generated by the money transfer application discussed in description of FIG. 2. The email can be addressed to a recipient email address 702 and sent from a service email address 704. The subject 706 can include a sender email address and an invoice amount. The description 708 can include a description of the invoice sent by the sender email address. Upon engaging with the link, the recipient can use the recipient device to send an indication to pay the invoice amount. The payment service system can receive data indicating the recipient engaged with the link. The payment service system can then submit a request to transfer the invoice amount from the account of the recipient to the account of the sender.

Figure 8:
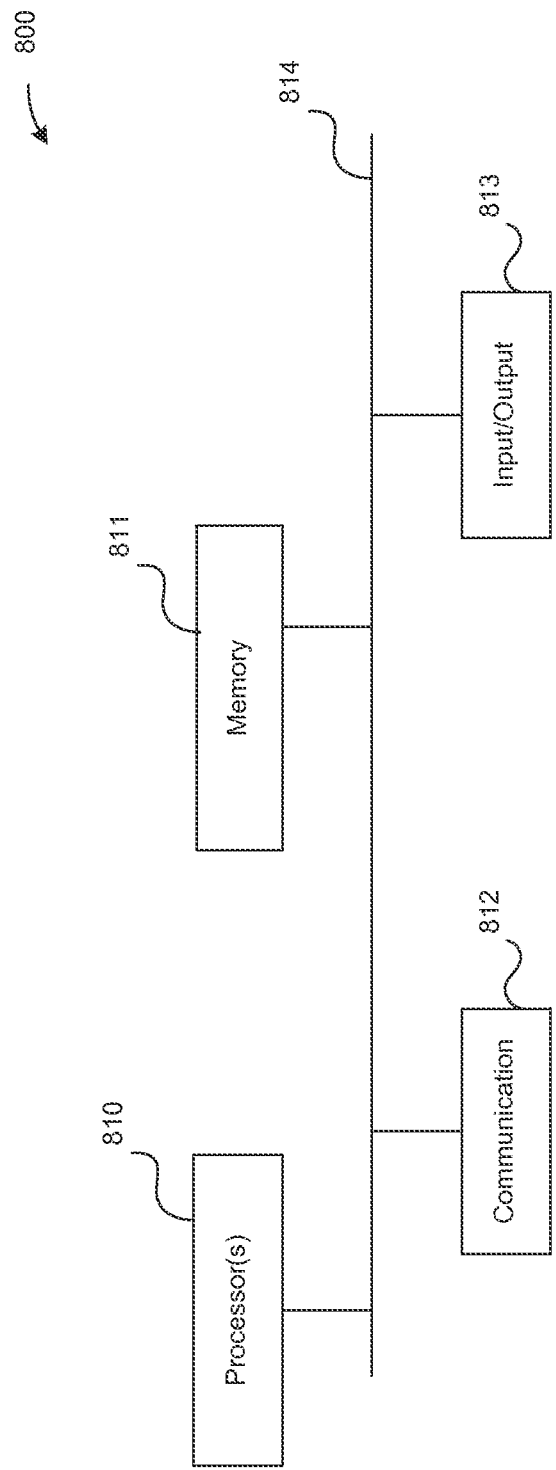
FIG. 8 is a high-level block diagram showing an example of processing system in which at least some operations described in the descriptions of the above figures can be implemented.

FIG. 8 is a high-level block diagram showing an example of a processing device 800 that can represent any of the devices described above, such as email system 104, system 108, secure servers 112, sender email server 122, recipient email server 124, sender device 102, or recipient device 103. Any of these systems may include two or more processing devices such as represented in FIG. 8, which may be coupled to each other via a network or multiple networks.

In the illustrated embodiment, the processing system 800 includes one or more processors 810, memory 811, a communication device 812, and one or more input/output (I/O) devices 813, all coupled to each other through an interconnect 814. In some embodiments, the processing system 800 may not have any I/O devices 813. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for timing a notification of an initiation of a monetary transfer, the method comprising:

receiving, by a financial computer system and from a first email address associated with a sender, an email which includes information that indicates a monetary amount to transfer from an account associated with the sender to a recipient via a monetary transfer transaction initiated based on the email, the email including header information that indicates an email address of the recipient;

determining, by the financial computer system, that the sender has not previously provided to the financial computer system account data associated with the account to use to withdraw funds for the monetary transfer transaction;

transmitting, by the financial computer system and to the first email address, a request configured to generate a prompt for the sender to input the account data;

determining, by the financial computer system, a period of wait time based on statistical data from a plurality of previously processed monetary transfer transactions; and in response to the financial computer determining that sender has not provided the account data to the financial computer system by the expiration of the period of wait time:

generating, by the financial computer system, a notification email indicating the status of the monetary transfer transaction;

transmitting the notification email, by the financial computer system, to the e-mail address associated with the recipient.

2. The method of claim 1, further comprising:

causing a credit, by the financial computer system, to an account associated with the recipient, of a first amount of funds to satisfy the monetary transfer transaction, the credit being based on a debit of a second amount of funds from the account associated with the sender, wherein a difference between the first amount of funds and the second amount of funds corresponds to a fee associated with the monetary transfer transaction.

3. The method of claim 1, wherein each of the plurality of previously processed monetary transfer transactions involves one or more users, wherein the statistical data, from a selected monetary transfer transaction of the plurality of monetary transfer transactions, includes a time duration, and wherein the time duration corresponds to an elapsed time, from receipt of an initiation email, which includes information that indicates an initiation of the selected monetary transfer transaction, to when account data for the selected monetary transfer transaction is provided for use for the monetary transfer transaction.

4. A method comprising:

receiving, by a computer system from a first device associated with a first user, an indication of an initiation of a financial transaction involving a monetary transfer from the first user to a second user and contact information associated with the second user;

determining, by the computer system, that the financial transaction cannot be completed unless the first user provides account information of a financial account associated with the first user;

determining, by a first computer system, based upon statistical data of a plurality of previously processed financial transactions, a period of wait time;

in response to determining that the financial transaction cannot be completed, delaying for the period of wait time, by the computer system, transmitting of a status electronic message to the second user, the status electronic message being indicative of a status of the financial transaction; and in response to the period of wait time expiring without the account information being provided, transmitting the status electronic message, by the computer system, to a second device associated with the second user based on the contact information.

5. The method of claim 4, wherein the indication of the financial transaction is an email from the first user that contains information that indicates the financial transaction, wherein the contact information is an email address associated with the second user, and wherein the financial account is for use in association with the financial transaction.

6. The method of claim 4, wherein the financial transaction is a monetary transfer transaction, the method further comprising:

causing a credit, to an account associated with the second user, of a first amount of funds to satisfy the monetary transfer transaction, the credit being based on a debit of a second amount of funds from the financial account.

7. The method of claim 4, wherein the indication of the financial transaction is a message that includes information that indicates the financial transaction, the message being any of an internet protocol (IP) message, a text message, an email message, a short messaging service (SMS) message, or an instant message (IM), and wherein the status electronic message is any of an IP message, a text message, an email message, an SMS message, or an IM.

8. The method of claim 4, further comprising:

determining the period of wait time based on an approximation of a time duration to provide the account information.

9. The method of claim 8, wherein each of the plurality of financial transactions involves a participant of a plurality of participants, each of the plurality of participants being involved in a financial transaction of the plurality of financial transactions, and wherein the statistical data includes response times associated with the plurality of financial transactions.

10. The method of claim 9, wherein a selected financial transaction of the plurality of financial transactions is associated with a selected participant of the plurality of participants, wherein the selected financial transaction cannot be completed unless the selected participant completes a task, and wherein the time duration corresponds to an elapsed time, from receipt of an initiation message, which includes information that indicates an initiation of the selected financial transaction, to when the task is completed.

11. The method of claim 10, wherein the task includes any of providing an account number of a financial account that is associated with the participant and that is being used in association with the selected financial transaction, providing a card verification value (CVV) of a payment card that is associated with the participant and that is being used in association with the selected financial transaction, or providing a personal identification number (PIN) of a payment card that is associated with the participant and that is being used in association with the selected financial transaction.

12. The method of claim 8,
wherein each of the plurality of financial transactions involve the first user, and
wherein the statistical data includes time durations that are respectively associated with the plurality of financial transactions.

13. The method of claim 8, wherein said determining of the period of wait time is based on a balance between avoidance of sending the status electronic message, and provision of timely status of the financial transaction to the second user.

14. The method of claim 4,
wherein the statistical data includes time durations that are associated with other users providing account information for previous financial transactions.

15. The method of claim 4,
wherein the period of time is further based on time durations associated with the first user providing other data for previous financial transactions.

16. The method of claim 4,
wherein the account information is any of a card verification value (CVV) of a payment card that is linked to the financial account, a personal identification number (PIN) of a payment card that is linked to the financial account, or the account number of the financial account.

17. The method of claim 4, wherein the first computer system and the computer system are a same computer system.

18. A system comprising:
a processor;
a communication interface, coupled to the processor, configured to communicate with other devices; and
a storage device coupled to the processor, the storage device storing instructions which, when executed by the processor, cause the system to perform operations including:
  receiving, via the communication interface from a first device associated with a first user, an indication, of an initiation of a financial transaction involving a monetary transfer from the first user to a second user and contact information associated with the second user;
  determining that the first user has not provided financial account information that is needed for the financial transaction;
  determining a period of wait time based on statistical data of a plurality of previously processed financial transactions;
  in response to the determination that the first user has not provided the financial account information, delaying for the period of wait time transmitting a status electronic message to the second user, the status electronic message being indicative of a status of the financial transaction; and
  in response to the period of wait time expiring without the financial account information being provided, transmitting the status electronic message to a second device associated with the second user based on the contact information.

19. The system of claim 18, wherein the operations further include:
determining that the financial transaction cannot be completed without the financial account information, wherein said of the period of wait time is determined further in response to said determining that the financial transaction cannot be completed.

20. The system of claim 18, wherein said determining of the period of wait time is to provide the first user with the period of wait time, to enable the first user to provide the financial account information.

21. The system of claim 18
wherein each of the plurality of financial transactions involves a participant of a plurality of participants, each of the plurality of participants being involved in a financial transaction of the plurality of financial transactions,
wherein the statistical data includes response times associated respectively with the plurality of financial transactions,
wherein each of the plurality of financial transactions is a same type of financial transaction,
wherein the financial account information is a selected type of data, and
wherein the statistical data includes a first data associated with a corresponding financial transaction, the first data being of the selected type.

22. The system of claim 21,
wherein said each of the plurality of financial transactions being the same type includes each of the plurality of financial transactions being a monetary transfer transaction, and
wherein the selected type of the data is an account number of a financial account.

\* \* \* \* \*